UNITED STATES PATENT OFFICE.

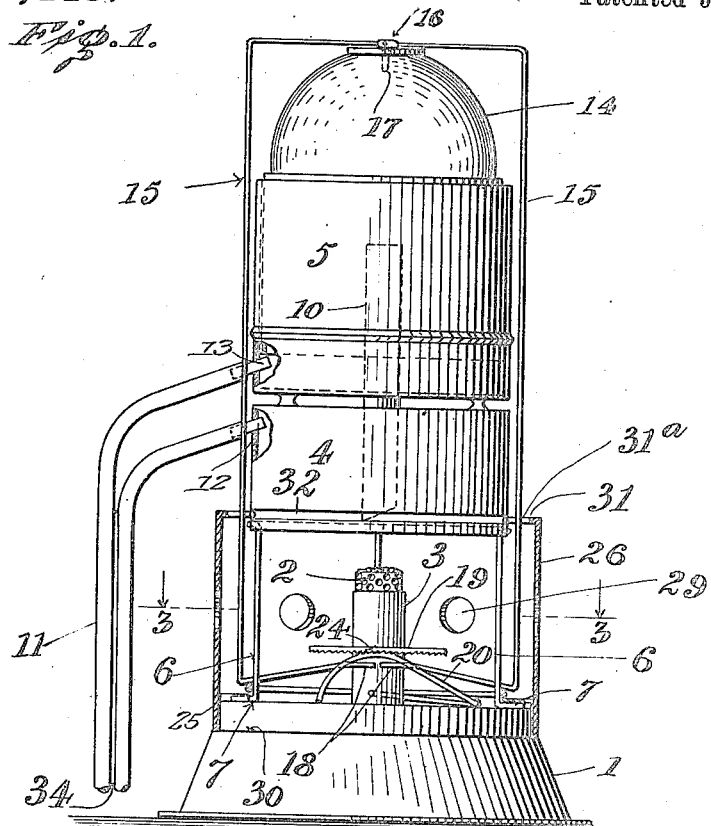
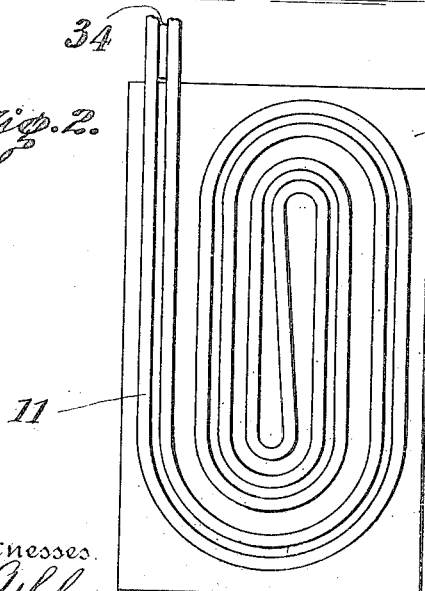
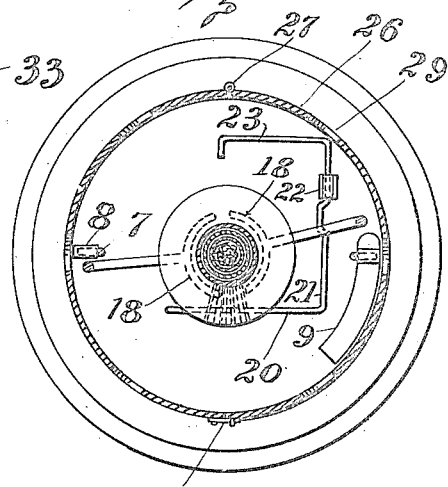

CHARLES W. SPURR, JR., OF ROXBURY, MASSACHUSETTS.

HOT APPLIANCE.

1,254,443.  Specification of Letters Patent.  Patented Jan. 22, 1918.

Application filed July 10, 1915, Serial No. 39,067.  Renewed October 22, 1917.  Serial No. 198,003.

*To all whom it may concern:*

Be it known that CHARLES W. SPURR, Jr., a citizen of the United States, and resident of Roxbury, in the county of Suffolk and State of Massachusetts, has invented certain new and useful Improvements in Hot Appliances, of which the following is a specification.

This invention relates to improvements in hot appliances or devices capable of maintaining constant temperatures for therapeutic use, through the medium of heated, circulating water, with means for varying the temperature by regulation of the source of heat.

My present improvements comprise, in an apparatus of the character indicated, wherein a heat flame is governed by a sliding sleeve, the employment of means whereby said sleeve is positively held in the positions to which set for the performance of its function, also of means for shielding the flame from the extinguishing action of air currents.

Other features of the invention include means for facilitating the flow of the circulating heated water through the apparatus, and means for generally improving its operation.

In the drawing:

Figure 1 is an elevation of my improved apparatus.

Fig. 2 is a plan view of a hot appliance, and

Fig. 3 is a horizontal section on the line 3—3 of Fig. 1.

The apparatus to which my improvements refer comprises a spirit lamp 1, which serves as a base or support for the superstructure of a water heating device, and has a perforated burner tube 2, containing which, together with a sliding sleeve 3, adapted to cover and uncover the perforations in said burner tube, to vary the size of the flame.

A water container, composed of the superposed vessels 4, 5, is supported upon the lamp 1, as by legs 6, which are adapted, by feet 7, to be disengagingly held by a socket 8 and spring clip 9 upon the upper surface of said lamp.

The vessels 4, 5 are connected by a tube 10, whose opposite, open ends, respectively, are exposed within said vessels; circulation of heated water occurring through a twin tube 11, whose opposite ends connect, respectively, with said vessels 4, 5, as at 12, 13.

A vertically moving dome 14, in the upper vessel 5, is adapted to rise with the expansion of the heated air therein, and to fall again with the cooling and contraction of the air therein, and, by means of a connection between said dome and the sliding sleeve 3, to thereby govern the extent of the burner flame.

This connecting means comprises a two-part rod 15, hinged at 16, where it has a depending pin or stud 17, that is seated in an orifice in the top of the dome, to localize it, the two arms of said rod 15 extending downwardly, outside the water container, and being inwardly bent at their lower ends, where they are provided with bifurcations, or yoke-like portions 18, which straddle the sleeve 3, at opposite sides thereof. Said sleeve 3 has an annular flange 19, which bears upon the rod portions 18, whereby, as the rod 15 rises with the upward movement of dome 14, the sleeve 3 also rises and thus tends to diminish the size of the flame. The two-part formation of rod 15, and its arrangement at opposite sides of the water container, avoids the creation of any tendency toward frictional binding of the dome 14 in its vertical movement within vessel 5, and also insures non-binding vertical movement of the sleeve 3 upon the burner tube, by means of the engagement of the two-part rod 15 at opposite sides beneath the flange 19.

The sleeve 3, in addition to its automatic operation in the manner described, is also manually controllable, so that the extent of the flame may be determined and set when it is desired to limit the degree to which the water is to be heated. This is accomplished by the employment of a vertically bowed lever 20, having an arm 21 bent at right angles thereto, and frictionally pivoted in a strap bearing 22 upon the lamp 1, with an operating handle 23. The upper surface of lever 20 is serrated or formed as a rack, and is adapted to bear against the under surface of flange 19, which latter is provided with corrugations 24, or is otherwise roughened or rendered frictionally engaging, in order that, with the elevation of the lever 20 to a desired height, carrying the flange 19 therewith, the sleeve 3 may thereby be positively retained in the position to which set.

A removable guard or shield, as 25, is provided to surround the burner space between the lamp and water container, to prevent the flame from being influenced by air currents, which would otherwise impair its heat efficiency. Said guard is in the form of a two part cylinder 26, hinged as at 27, and having fastening means, as 28, at its free ends. Orifices, as at 29, may be provided in said guard, to supply air for combustion.

The guard 26 is supported at its lower edge upon an annular shoulder 30 formed about the lamp, and said guard, at its upper end, has an inwardly directed, annular flange 31, whereby it makes fitting engagement within a concentric groove 32 provided in the outer surface of the vessel 4. The flange 31 is provided with slots 31ᵃ to receive the rod portions 15.

The said guard may, as seen, be conveniently adjusted in operative position, or removed to permit access to the burner.

The heated water is circulated through the twin tubing 11 aforesaid, which is coiled upon and secured to a rubber mat 33, to thereby serve as a hot appliance or pad. The free portion of the tubing 11, to avoid kinking in its length between the mat and the water container, has its outgoing and return portions connected together by a web, as 34, by which means the liability of the separate tube portions to kink and thus retard or stop the circulation therethrough is greatly diminished.

Variations may be resorted to within the spirit and scope of my invention, and parts thereof used without others.

I claim:—

In a hot appliance, the combination with a water circulating container, a supporting lamp having a burner tube, and a flexible twin-tube connecting with a heating pad, of an expansion dome, having an orifice, a sliding sleeve upon the burner tube to regulate the flame, a flange upon said sleeve, and a hinged rod with a stud seated in said dome orifice, said rod having arms depending at opposite sides of the water circulating container, and said arms having inwardly directed, yoke-like ends, to straddle said sleeve and bear upwardly against said flange, to communicate the movement of said dome to said sleeve.

Signed at Roxbury, in the county of Suffolk and State of Massachusetts, this 23d day of March, A. D. 1915.

CHARLES W. SPURR, Jr.

Witnesses:
WHEATON KITTREDGE,
JAMES P. CLEARY, Jr.